(12) United States Patent
Ori (10) Patent No.: US 6,785,057 B2
(45) Date of Patent: Aug. 31, 2004

(54) THREE-GROUP ZOOM LENS

(75) Inventor: Tetsuya Ori, Koshigaya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/609,368

(22) Filed: Jul. 1, 2003

(65) Prior Publication Data

US 2004/0051963 A1 Mar. 18, 2004

(30) Foreign Application Priority Data

Aug. 29, 2002 (JP) .......................................... 2002-251211

(51) Int. Cl.[7] .............................................. G02B 15/14
(52) U.S. Cl. ......................... 359/689; 359/680; 359/684
(58) Field of Search ................................ 359/689, 680, 359/682, 685, 708, 713–716, 684, 683

(56) References Cited

U.S. PATENT DOCUMENTS

| | | | |
|---|---|---|---|
| 6,351,337 B1 | 2/2002 | Tanaka | |
| 6,614,599 B1 * | 9/2003 | Watanabe | 359/689 |
| 2003/0169509 A1 * | 9/2003 | Iyama | 359/680 |
| 2004/0004772 A1 * | 1/2004 | Ohashi et al. | 359/689 |

FOREIGN PATENT DOCUMENTS

| | | |
|---|---|---|
| JP | 2001-272602 | 10/2001 |
| JP | 2001-296476 | 10/2001 |

* cited by examiner

Primary Examiner—Georgia Epps
Assistant Examiner—M. Hasan
(74) Attorney, Agent, or Firm—Arnold International; Jon W. Henry; Bruce Y. Arnold (57) ABSTRACT

A three-group zoom lens includes, in order from the object side, a first lens group of negative refractive power, and second and third lens groups, each of positive refractive power. The first and second lens groups include negative and positive components and the third lens group is a single lens component. All but one lens component may be a single lens element. When zooming from the wide-angle end to the telephoto end, the first and second lens groups move closer together while the second lens group moves farther from the third lens group. The third lens group remains stationary during zooming but moves for focusing. The second lens group includes a diaphragm on its object side. Aspheric lens surfaces are disclosed. The zoom lens satisfies certain conditions for the focal lengths of the zoom lens and a component of the zoom lens, and for Abbe numbers of two lens elements.

20 Claims, 6 Drawing Sheets

THREE-GROUP ZOOM LENS

BACKGROUND OF THE INVENTION

Three-group zoom lenses are known in the prior art and have been widely used in attempting to provide compact zoom lenses with good correction of aberrations. Recently, digital cameras and video cameras have become highly popular, and in these cameras, small size, high image quality including low distortion and good correction of other aberrations, as well as satisfaction of various conditions connected to the use of solid state image pickup elements in these cameras, have been desired. Additionally, in digital cameras and video cameras, autofocus has become an essential focusing mode and ever faster autofocusing is desired.

The above considerations have resulted in three-group zoom lenses, rather than two-group zoom lenses, being used in such cameras and inner focus or rear focus lenses being used in such cameras because these features enable the zoom lens to weight less and enable the driven lens components to be the ones close to the camera body, which facilitates the drive operation of these cameras. For example, Japanese Laid-Open Patent Applications 2000-284177, 2001-272602, and 2001-296476 disclose three-group zoom lenses that use rear focus and are designed for quick focusing, small size, and high resolution with good aberration correction.

In the zoom lenses described in Japanese Laid-Open Patent Application 2000-284177, the spacing between the second lens group and the third lens group remains nearly constant over the range of zooming while focusing is performed by moving the third lens group in the direction of the optical axis. Therefore, the proper spacings between the second lens group and the third lens group for focusing at infinity must be achievable throughout the range of zooming. Thus, it is difficult to further shorten the overall length of the lens system using a retractable lens when the various requirements of the lens barrel regarding the required movements of the lens groups are considered.

Moreover, the zoom lenses described in all three Japanese published applications listed above require a cam mechanism for jointly moving the second lens group and the third lens group during zooming. Hence there is a restriction on shortening the total length of the lens system in the case of a retractable lens barrel. Accordingly, with the zoom lenses of the three Japanese published applications listed above, it is difficult to greatly reduce the total length of the optical systems with a retractable lens barrel, which limits the compactness of cameras using such zoom lenses when the cameras are not being used.

BRIEF SUMMARY OF THE INVENTION

The present invention relates to a three-group zoom lens that has a zoom ratio of about three times but has a short overall length of the optical system and favorable correction of aberrations. In particular, the present invention relates to a three-group zoom lens that may be used in a digital camera or a video camera and that may be used with a solid state image pickup element.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
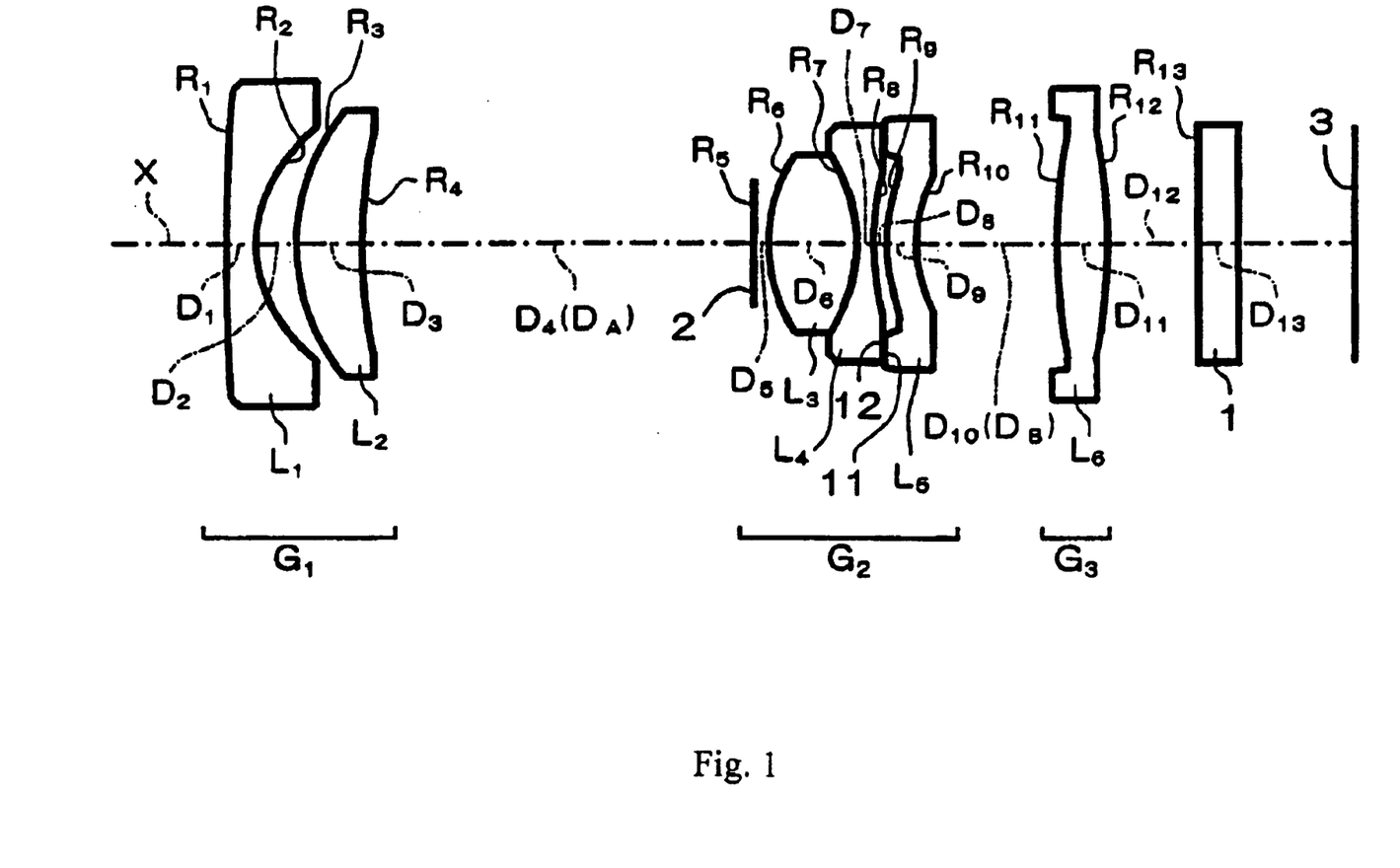
FIG. 1 shows a cross-sectional view of the zoom lens according to Embodiment 1.

A general description of the three-group zoom lens of the present invention that pertains to all three embodiments of the invention will first be described with reference to FIGS. 1–4 that show Embodiment 1. In FIG. 1, lens elements are referenced by the letter L with a subscript denoting their order from the object side of the zoom lens along the optical axis X, from $L_1$ to $L_6$. Similarly, radii of curvature of the surfaces of various optical elements, including the lens surfaces, are referenced by the letter R with a subscript denoting their order from the object side of the zoom lens, from $R_1$ to $R_{13}$. The on-axis surface spacings along the optical axis X of various optical surfaces are referenced by the letter D with a subscript denoting their order from the object side of the zoom lens, from $D_1$ to $D_{13}$. In the same manner, the three lens groups are labeled $G_1$ through $G_3$ in order from the object side of the zoom lens and the lens components belonging to each lens group are indicated by lower brackets adjacent the labels $G_1$–$G_3$.

The term "lens group" is defined in terms of "lens elements" and "lens components" as explained herein. The term "lens element" is herein defined as a single transparent mass of refractive material having two opposed refracting surfaces, which surfaces are positioned at least generally transversely of the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." The term "lens group" is used herein to define an assembly of one or more lens components that are fixed or are movable as a single unit.

As shown in FIG. 1, a diaphragm 2 that controls the amount of light that passes through the zoom lens is included in the second lens group $G_2$. An image pickup device, such as a CCD (not shown), is arranged at the image plane 3. A low-pass filter or an infrared cutoff filter 1 is arranged between the third lens group $G_3$ and the image plane 3.

Figure 2A:
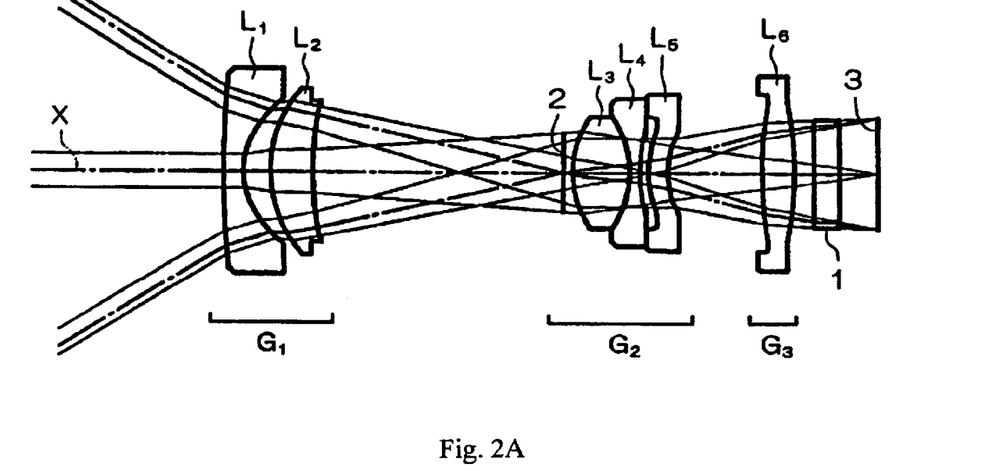
FIGS. 2A–2B show cross-sectional views of the zoom lens of FIG. 1 at the wide-angle end with the focus set at infinity and at the near point, respectively.
Figure 2B:
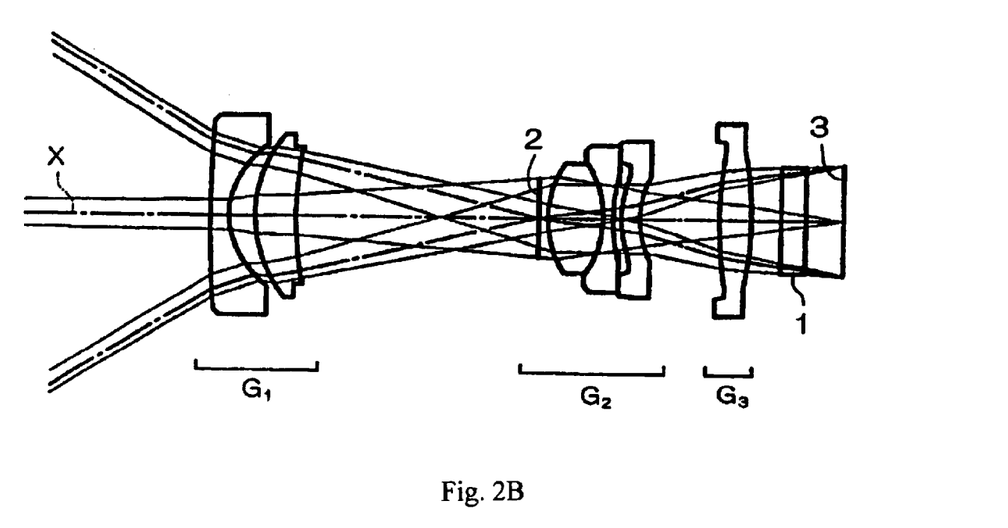
Figure 3A:
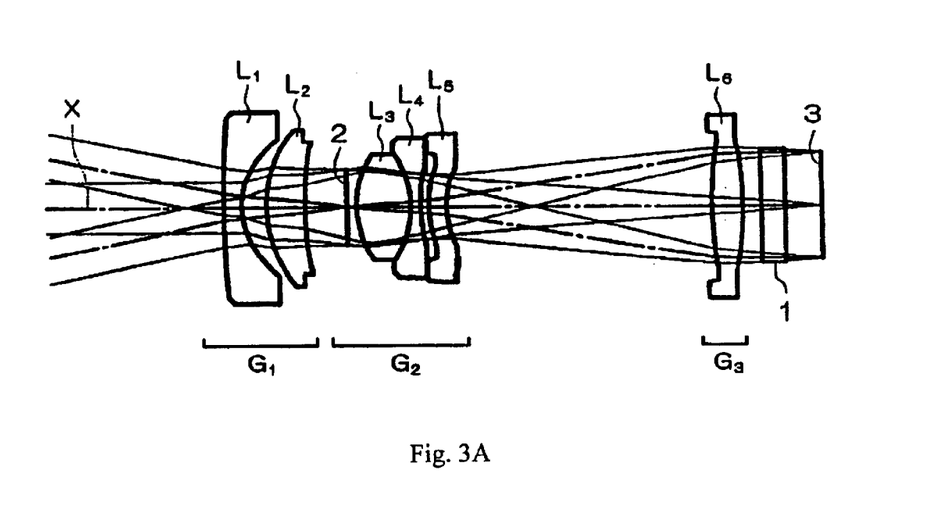
FIGS. 3A–3B show cross-sectional views of the zoom lens of FIG. 1 at the telephoto end with the focus set at infinity and at the near point, respectively.
Figure 3B:
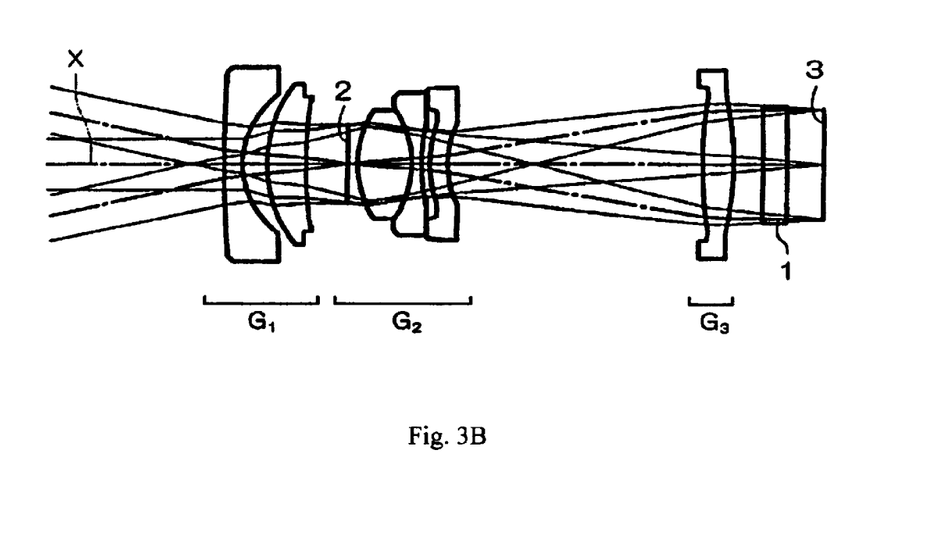
Figure 4:
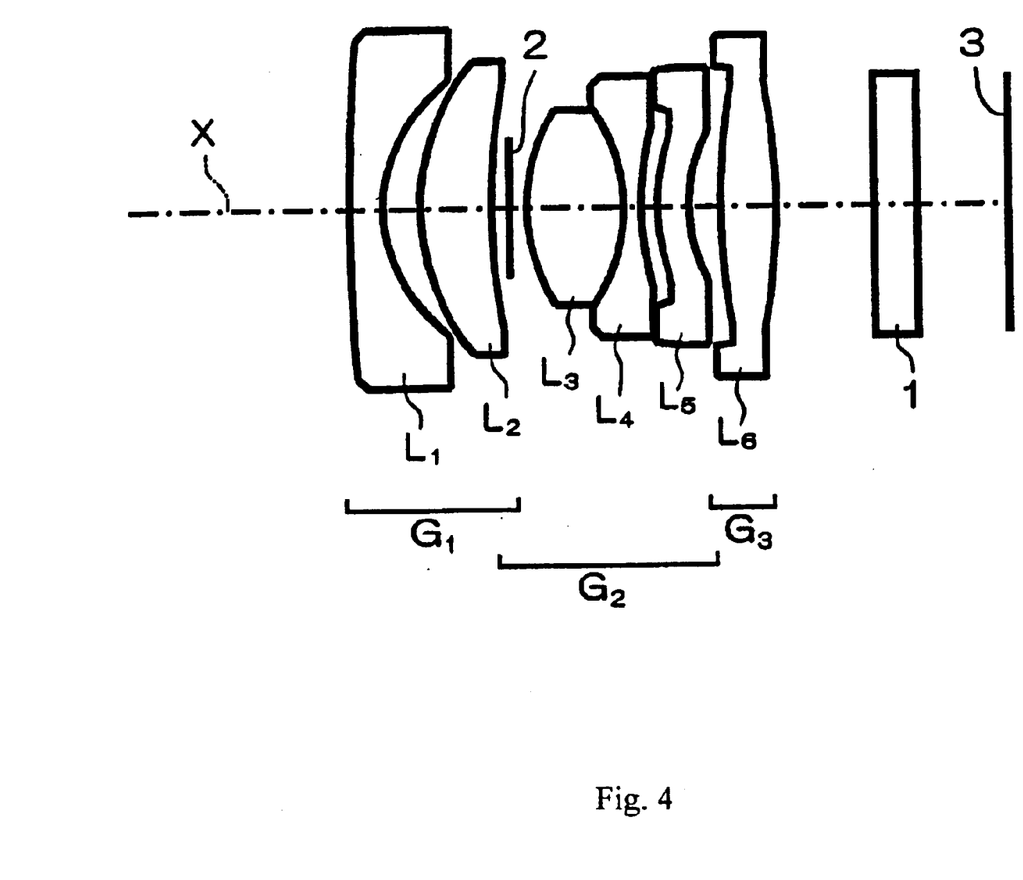
FIG. 4 shows a cross-sectional view of the zoom lens according to Embodiment 1 with the zoom lens retracted.

FIGS. 2A and 2B show cross-sectional views of the zoom lens of FIG. 1 at the wide-angle end with the focus set at infinity and at the near point, respectively. FIGS. 3A and 3B show cross-sectional views of the zoom lens of FIG. 1 at the telephoto end with the focus set at infinity and at the near point, respectively. In both Embodiments 1 and 2 that follow, the near point of focus is 10 cm on the object side from the vertex of the object side lens surface of the first lens element $L_1$ when the zoom lens is at the wide-angle end and 80 cm when the zoom lens is at the telephoto end. FIG. 4 shows a cross-sectional view of the zoom lens of FIG. 1 with the zoom lens retracted.

In order to improve imaging, lens surfaces may be aspheric lens surfaces. The lens surfaces that are aspheric satisfy the following equation:

$$Z=[(Y^2/R)/\{1+(1-K\cdot Y^2/R^2)^{1/2}\}]+A_4Y^4+A_6Y^6+A_8Y^8+A_{10}Y^{10} \quad \text{(Equation A)}$$

where

Z is the length (in mm) of a line drawn from a point on the aspheric surface at a distance Y from the optical axis to the tangential plane of the aspheric surface vertex, R is the radius of curvature (in mm) of the aspheric surface on the optical axis, Y is the distance (in mm) from the optical axis, K is the eccentricity, and $A_4, A_6, A_8,$ and $A_{10}$ are the 4th, 6th, 8th, and 10th aspheric coefficients.

As shown in FIG. 1, the three-group zoom lens of the present invention includes, in order from the object side, a first lens group $G_1$ having negative refractive power, a second lens group $G_2$ having positive refractive power, and a third lens group $G_3$ having positive refractive power. The three-group zoom lens is constructed so that the first lens group $G_1$ and the second lens group $G_2$ are moved closer together and the second lens group $G_2$ is moved farther away from the third lens group $G_3$ during zooming from the wide-angle end to the telephoto end. On the other hand, the third lens group $G_3$ is stationary during zooming and is moved toward the object side when focusing the zoom lens from infinity to a near point. The focal length f of the entire zoom lens is changed and a light beam is focused on the imaging plane 3 efficiently by moving the three lens groups, $G_1, G_2, G_3,$ along the optical axis X in this manner.

In the following descriptions, references will be frequently made to a "lens element." However, as set forth above, it is understood that numerous of the lens elements described below are also lens components and may be replaced by lens components that include more than one lens element.

The first lens group $G_1$ includes, in order from the object side, a first lens element $L_1$ having negative refractive power and a meniscus shape with its concave lens surface on its image side and a second lens element $L_2$ having positive refractive power and a meniscus shape with its convex lens surface on its object side. The second lens group $G_2$ includes, in order from the object side, a lens component formed of a third lens element $L_3$ that is a biconvex lens element and a fourth lens element $L_4$ that is a biconcave lens element and that is intimately bonded to the third lens element $L_3$, and a fifth lens element $L_5$ of meniscus shape with a concave lens surface on its image side. The term "intimately bonded" is defined herein generally to mean that adjacent refractive surfaces of two lens elements have substantially the same curvature and are held in direct fixed contact or are separated by a thin layer of transparent adhesive (too thin to be considered in optical computations) that fixes the lenses together, the latter being commonly referred to as a "cemented" lens element arrangement.

Additionally, in both Embodiments 1 and 2 to be more fully described below, the second lens group $G_2$ includes a diaphragm 2 on the object side of the third lens element $L_3$ that controls the amount of light that passes through the zoom lens.

The third lens group $G_3$ includes a sixth lens element $L_6$ that is a biconvex lens element. On the image side of the sixth lens element $L_6$ is the filter 1 followed by the image plane 3. The third lens group $G_3$ is set in a reference retracted position corresponding to the focus being at infinity and in a lens barrel situated, for example, in a camera case. The third lens group $G_3$ is driven independently of the other lens groups $G_1$ and $G_2$ for focusing by an actuator (not shown, such as a motor) so as to move along the optical axis X. Thus, the third lens group $G_3$ can be moved quickly and easily to the retracted position shown in FIG. 4, providing a compact arrangement of lens groups, thereby providing a very short zoom lens in the retracted position.

As shown in FIGS. 1–4, lens elements $L_4$ and $L_5$ include planar peripheral portions parallel to one another and perpendicular to the optical axis X that are in direct contact with one another or separated by a plane parallel plate. In general, the use of such planar parallel portions improves the assembly accuracy of the lens components of the second lens group $G_2$, including reducing problems of decentering of the lens elements along the optical axis X.

Preferably, the three-group zoom lens satisfies the following condition:

$$f_w/|f_{2-f}|<0.2 \quad \text{Condition (1)}$$

where $f_w$ is the focal length of the entire three-group zoom lens at the wide-angle end, and $f_{2-f}$ is the focal length of the image-side lens component of the second lens group $G_2$, which as shown in FIGS. 1–4 is the fifth lens element $L_5$.

When Condition (1) above is satisfied, the focus shift due to changes in the ambient temperature and the ambient humidity are reduced. Additionally, Condition (1) may be satisfied by the meniscus lens element $L_5$ being made of plastic which allows the lens element to be made inexpensively. Additionally, the meniscus lens element $L_5$ can be made to include aspheric lens surfaces easily and inexpensively when it is made of plastic.

Additionally, preferably the three-group zoom lens satisfies the following condition:

$$\nu_3-\nu_4>14 \quad \text{Condition (2)}$$

where $\nu_3$ is the Abbe number of the biconvex lens element of the second lens group $G_2$, and $\nu_4$ is the Abbe number of the biconcave lens element of the second lens group $G_2$.

Condition (2) limits the difference in Abbe numbers of the materials of the two lens elements of the second lens group $G_2$ that are intimately bonded together. By satisfying Condition (2), the lateral color at the wide-angle end and the axial chromatic aberration at the telephoto end can be well corrected.

By making the refractive power of the lens element $L_5$ in the second lens group negative, the composite refractive power of this lens and the positive lens $L_6$ that forms the third lens group is decreased. If both the lenses $L_5$ and $L_6$ are made of plastic, production costs can be reduced and the overall image quality enhanced. Thus, making the refractive power of the lens element $L_5$ negative decreases the focus shift due to temperature/humidity changes. Because the composite refractive power of the lenses $L_5$ and $L_6$ is less, negative distortion generated at the wide-angle end can be suppressed, and the amount of distortion correction required at the aspheric lens surfaces of the first lens element $L_1$ can be reduced. At the same time, the correction of field curvature at the wide-angle end can be improved so as to improve the overall image quality.

Because in the three-group zoom lens of the present invention the third lens group $G_3$ is fixed at a predetermined reference position corresponding to a focus position at infinity when the zoom lens is retracted, from which it, and it alone, moves during focusing, the focusing operation is easily achieved by an actuator, such as a motor, and the retracted length of the entire zoom lens may be made very short. Additionally, because lens elements that are intimately bonded together are used in the second lens group $G_2$, there is no air space between these lens elements, which results in zero spacing between them so that the second lens group $G_2$ can be made thinner, assisting in making the length of the entire zoom lens ever shorter. Furthermore, such a construction, along with the first lens group $G_1$ and the second lens group $G_2$ including at least one aspheric lens surface, enables the three-group zoom lens to achieve favorable correction of aberrations even if only a total of six lens elements are used in the three-group zoom lens.

Embodiments 1 and 2 of the present invention will now be individually described with further reference to the drawings.

Embodiment 1

In Embodiment 1, as shown in FIGS. 1–4, the fifth lens element $L_5$ has negative refractive power. Additionally, the sixth lens element $L_6$ has a lens surface of greater curvature on the image side and both lens surfaces of the first lens element L, and the fifth lens element $L_5$ are aspheric lens surfaces.

Table 1 below lists the surface number #, in order from the object side, the radius of curvature R (in mm) of each surface near the optical axis, the on-axis surface spacing D (in mm) between surfaces, as well as the refractive index $N_d$ and the Abbe number $v_d$ (at the d-line of 587.6 nm) of each lens element for Embodiment 1. Listed in the bottom portion of Table 1 are the focal length f and the f-number $F_{NO}$ at the wide-angle and telephoto ends, and the maximum image angle $2\omega$ at the wide-angle end and telephoto end for Embodiment 1.

TABLE 1

| # | R | D | $N_d$ | $v_d$ |
|---|---|---|---|---|
| 1* | 55.1184 | 1.00 | 1.80348 | 40.4 |
| 2* | 4.1000 | 1.40 | | |
| 3 | 7.0428 | 2.19 | 1.84666 | 23.8 |
| 4 | 19.3593 | $D_4$ (variable) | | |
| 5 (stop) | ∞ | 0.50 | | |
| 6 | 5.4370 | 2.99 | 1.77250 | 49.6 |

TABLE 1-continued

| # | R | D | $N_d$ | $v_d$ |
|---|---|---|---|---|
| 7 | −5.4370 | 0.56 | 1.72151 | 29.2 |
| 8 | 9.8887 | 0.45 | | |
| 9* | 5.7325 | 1.00 | 1.50869 | 56.0 |
| 10* | 5.3643 | $D_{10}$ (variable) | | |
| 11 | 20.8289 | 1.70 | 1.50869 | 56.0 |
| 12 | −18.5391 | 2.98 | | |
| 13 | ∞ | 1.30 | 1.51680 | 64.2 | f = 5.2–14.40 mm    $F_{NO}$ = 2.9–5.0    $2\omega$ = 59.6°–22.4°

The lens surfaces with a * to the right of the surface number in Table 1 are aspheric lens surfaces, and the aspheric surface shape of these lens elements is expressed by Equation (A) above.

Table 2 below lists the values of the constants K, $A_4$, $A_6$, $A_8$, and $A_{10}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E−2" represents the number $1.0 \times 10^{-2}$.

TABLE 2

| # | K | $A_4$ | $A_6$ | $A_8$ | $A_{10}$ |
|---|---|---|---|---|---|
| 1 | 1.282695 | −0.2826525E−3 | 0.1971951E−4 | −0.5887686E−6 | 0.7724510E−8 |
| 2 | −0.780090 | 0.1803997E−2 | −0.4271172E−5 | 0.6618535E−6 | −0.1738877E−7 |
| 9 | 2.510877 | −0.1615613E−2 | −0.3162416E−3 | −0.3309882E−4 | −0.1462002E−6 |
| 10 | −2.834706 | 0.6604927E−2 | −0.2519868E−3 | −0.2436108E−4 | −0.1082942E−6 |

In the zoom lens of Embodiment 1, lens groups $G_1$ and $G_2$ move to vary their separations and the separation of lens group $G_2$ from lens group $G_3$ during zooming. Therefore, the values of the on-axis spacings $D_4$ and $D_{10}$ vary. Table 3 below lists the values of the variables $D_4$ and $D_{10}$ (i.e., the on-axis spacings) at the wide-angle end (Wide), at an intermediate position, and at the telephoto end (Tele). The focal length of the zoom lens when focused at infinity is 5.2 mm at the wide-angle end, 8.63 mm at the intermediate position, and 14.4 mm at the telephoto end.

TABLE 3

| # | Wide | Intermediate | Tele |
|---|---|---|---|
| $D_4$ | 13.11 | 6.44 | 2.39 |
| $D_{10}$ | 4.82 | 8.52 | 14.74 |

The zoom lens of Embodiment 1 of the present invention satisfies both Conditions (1) and (2) above as set forth in Table 4 below.

TABLE 4

| Condition No. | Condition | Value |
|---|---|---|
| (1) | $f_w/|f_{2-t}| < 0.2$ | 0.0026 |
| (2) | $v_3 - v_4 > 14$ | 20.4 |

Figures 5A, 5B:
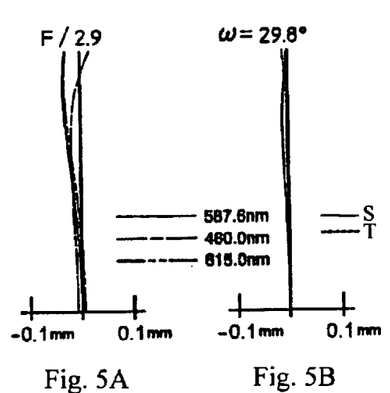
FIGS. 5A–5D show the spherical aberration, astigmatism, distortion, and lateral color, respectively, of the zoom lens according to Embodiment 1 at the wide-angle end.
Figure 5C:
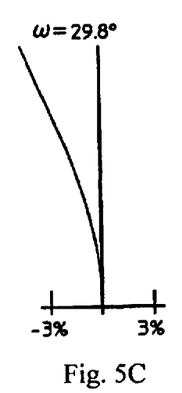
Figure 5D:
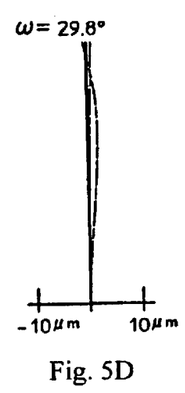
Figures 5E, 5F:
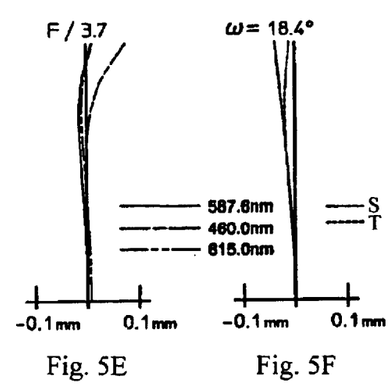
FIGS. 5E–5H show the spherical aberration, astigmatism, distortion, and lateral color, respectively, of the zoom lens according to Embodiment 1 at an intermediate position.
Figure 5G:
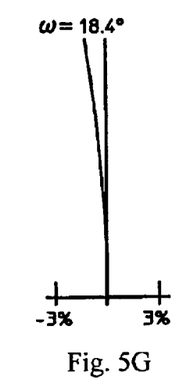
Figure 5H:
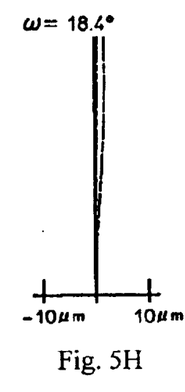
Figures 5I, 5J:
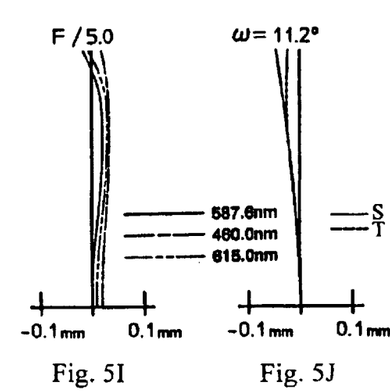
FIGS. 5I–5L show the spherical aberration, astigmatism, distortion, and lateral color, respectively, of the zoom lens according to Embodiment 1 at the telephoto end.
Figure 5K:
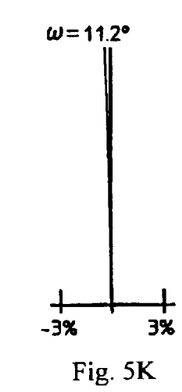
Figure 5L:
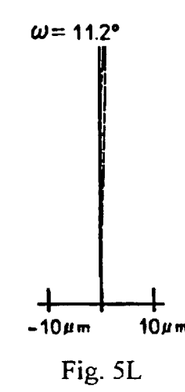

FIGS. 5A–5D show the spherical aberration, astigmatism, distortion, and lateral color, respectively, of the zoom lens of Embodiment 1 at the wide-angle end. FIGS. 5E–5H show the spherical aberration, astigmatism, distortion, and lateral color, respectively, of the zoom lens of Embodiment 1 at the intermediate position, and FIGS. 5I–5L show the spherical aberration, astigmatism, distortion, and lateral color, respectively, of the zoom lens of Embodiment 1 at the telephoto end. In FIGS. 5A, 5E, and 5I, the spherical aberration is shown for the wavelengths 587.6 nm (the d-line), 460.0 nm, and 615.0 nm. In the remaining figures, $\omega$ is the half-image angle. In FIGS. 5B, 5F and 5J, the astigmatism is shown for the sagittal image surface by solid line curves and the tangential image surface by dotted line curves. In FIGS. 5C, 5G and 5K, distortion is measured at 587.6 nm (the d-line). In FIGS. 5D, 5H and 5L, the lateral color is shown for the wavelengths 460.0 nm and 615.0 nm relative to 587.6 nm (the d-line). As is apparent from these figures, the various aberrations are favorably corrected over the entire zoom range.

The lens surfaces with a * to the right of the surface number in Table 5 are aspheric lens surfaces, and the aspheric surface shape of these lens elements is expressed by Equation (A) above.

Table 6 below lists the values of the constants K, $A_4$, $A_6$, $A_8$, and $A_{10}$ used in Equation (A) above for each of the aspheric lens surfaces of Table 5. Aspheric coefficients that are not present in Table 6 are zero. An "E" in the data indicates that the number following the "E" is the exponent to the base 10. For example, "1.0E–2" represents the number $1.0 \times 10^{-2}$.

TABLE 6

| # | K | $A_4$ | $A_6$ | $A_8$ | $A_{10}$ |
|---|---|---|---|---|---|
| 1 | −1.897722 | −0.4267753E−3 | 0.1584805E−4 | −0.2595439E−6 | 0.1597127E−8 |
| 2 | −0.302062 | 0.4537918E−3 | 0.1219269E−4 | 0.4610195E−6 | −0.1312182E−7 |
| 9 | 0.141779 | 0.9503975E−3 | 0.4713450E−4 | −0.6622317E−4 | 0.2438356E−5 |
| 10 | −6.084744 | 0.7852092E−2 | −0.1797004E−3 | −0.2113089E−4 | −0.1514149E−5 |

Embodiment 2

Embodiment 2 is very similar to Embodiment 1 and therefore only the differences between Embodiment 2 and Embodiment 1 will be explained. Embodiment 2 differs from Embodiment 1 in its lens element configuration only by different radii of curvature of lens surfaces, different eccentricities and aspheric coefficients of the aspheric lens surfaces, different optical element surface spacings, and some different refractive indexes and Abbe numbers of the materials of lens elements. Because of these differences, in Embodiment 2, the fifth lens element $L_5$ has positive refractive power, rather than negative refractive power as in Embodiment 1, and the sixth lens element $L_6$ has a lens surface of greater curvature on the object side, rather than on the image side as in Embodiment 1.

Table 5 below lists the surface number #, in order from the object side, the radius of curvature R (in mm) of each surface near the optical axis, the on-axis surface spacing D (in mm) between surfaces, as well as the refractive index $N_d$ and the Abbe number $\nu_d$ (at the d-line of 587.6 nm) of each lens element for Embodiment 2. Listed in the bottom portion of Table 5 are the focal length f and the f-number $F_{NO}$ at the wide-angle and telephoto ends, and the maximum image angle $2\omega$ at the wide-angle end and the telephoto end for Embodiment 2.

TABLE 5

| # | R | D | $N_d$ | $\nu_d$ |
|---|---|---|---|---|
| 1* | 24.521 | 1.00 | 1.80348 | 40.4 |
| 2* | 4.5009 | 2.24 | | |
| 3 | 8.2926 | 1.91 | 1.92286 | 20.9 |
| 4 | 14.3578 | $D_4$ (variable) | | |
| 5 (stop) | ∞ | 0.40 | | |
| 6 | 5.4504 | 3.38 | 1.69680 | 55.5 |
| 7 | −5.4504 | 0.56 | 1.64769 | 33.8 |
| 8 | 7.3050 | 0.20 | | |
| 9* | 4.9983 | 0.95 | 1.50869 | 56.0 |
| 10* | 6.1706 | $D_{10}$ (variable) | | |
| 11 | 17.4663 | 1.87 | 1.48749 | 70.2 |
| 12 | −31.7154 | 3.43 | | |
| 13 | ∞ | 1.05 | 1.51680 | 64.2 | f = 5.84–16.05 mm    $F_{NO}$ = 2.9–5.0    $2\omega$ = 62.2°–23.8°

In the zoom lens of Embodiment 2, lens groups $G_1$ and $G_2$ move to vary their separations and the separation of lens group $G_2$ from lens group $G_3$ during zooming. Therefore, the values of the on-axis spacings $D_4$ and $D_{10}$ vary. Table 7 below lists the values of the variables $D_4$ and $D_{10}$ (i.e., the on-axis spacings) at the wide-angle end (Wide), at the intermediate position, and at the telephoto end (Tele). The focal length of the zoom lens when focused at infinity is 5.84 mm at the wide-angle end, 9.69 mm at the intermediate position, and 16.05 mm at the telephoto end.

TABLE 7

| # | Wide | Intermediate | Tele |
|---|---|---|---|
| $D_4$ | 14.20 | 7.11 | 2.85 |
| $D_{10}$ | 6.12 | 10.37 | 17.40 |

The zoom lens of Embodiment 2 of the present invention satisfies both Conditions (1) and (2) above as set forth in Table 8 below.

TABLE 8

| Condition No. | Condition | Value |
|---|---|---|
| (1) | $f_w/|f_{2-r}| < 0.2$ | 0.144 |
| (2) | $\nu_3 - \nu_4 > 14$ | 21.7 |

Figures 6A, 6B:
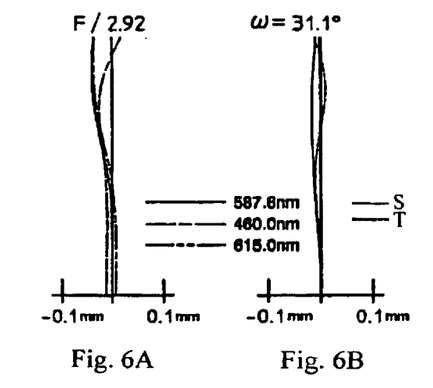
FIGS. 6A–6D show the spherical aberration, astigmatism, distortion, and lateral color, respectively, of the zoom lens according to Embodiment 2 at the wide-angle end.
Figure 6C:
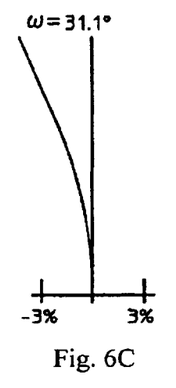
Figure 6D:
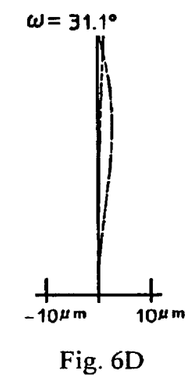
Figures 6E, 6F:
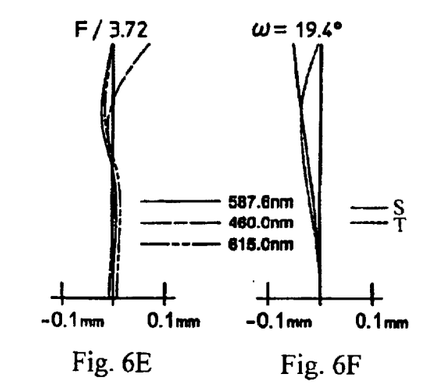
FIGS. 6E–6H show the spherical aberration, astigmatism, distortion, and lateral color, respectively, of the zoom lens according to Embodiment 2 at an intermediate position.
Figure 6G:
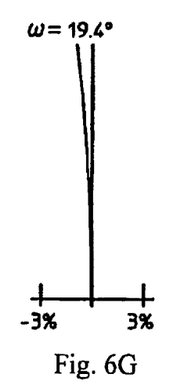
Figure 6H:
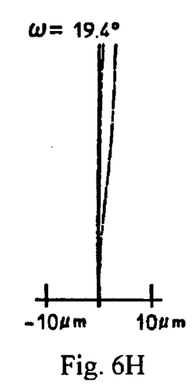
Figures 6I, 6J:
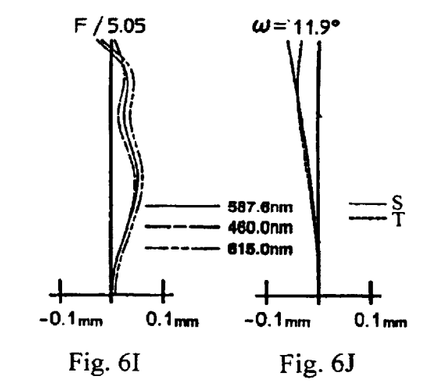
FIGS. 6I–6L show the spherical aberration, astigmatism, distortion, and lateral color, respectively, of the zoom lens according to Embodiment 2 at the telephoto end.
Figure 6K:
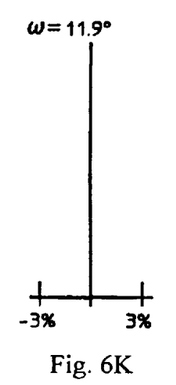
Figure 6L:
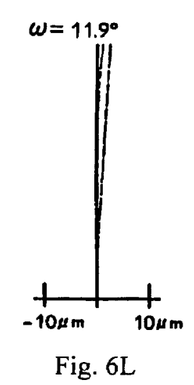

FIGS. 6A–6D show the spherical aberration, astigmatism, distortion, and lateral color, respectively, of the zoom lens of Embodiment 2 at the wide-angle end. FIGS. 6E–6H show the spherical aberration, astigmatism, distortion, and lateral color, respectively, of the zoom lens of Embodiment 2 at the intermediate position, and FIGS. 6I–6L show the spherical aberration, astigmatism, distortion, and lateral color, respectively, of the zoom lens of Embodiment 2 at the telephoto end. In FIGS. 6A, 6E, and 6I, the spherical aberration is shown for the wavelengths 587.6 nm (the d-line), 460.0 nm, and 615.0 nm. In the remaining figures, $\omega$ is the half-image angle. In FIGS. 6B, 6F and 6J, the astigmatism is shown for the sagittal image surface by solid line curves and the tangential image surface by dotted line curves. In FIGS. 6C, 6G and 6K, distortion is measured at 587.6 nm (the d-line). In FIGS. 6D, 6H and 6L, the lateral color is shown for the wavelengths 460.0 nm and 615.0 nm relative to 587.6 nm (the d-line). As is apparent from these figures, the various aberrations are favorably corrected over the entire zoom range.

The present invention is not limited to the aforementioned embodiments, as it will be obvious that various alternative implementations are possible. For example, the number of lens elements and lens components, values such as the radius of curvature R of each of the lens elements and components, the surface spacings D, the refractive index $N_d$, as well as the Abbe number $v_d$, are not limited to the examples indicated in each of the aforementioned embodiments, as other values can be adopted. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens formed of only three lens groups, in order from the object side, as follows:

a first lens group having negative refractive power;
a second lens group having positive refractive power; and
a third lens group having positive refractive power;
wherein
the first lens group includes, in order from the object side, a negative lens component and a positive lens component;
the second lens group includes, in order from the object side, a biconvex lens component and a biconcave lens component that is intimately bonded to said biconvex lens component, a meniscus lens component with its convex lens surface on its object side, and the second lens group further includes a diaphragm for controlling the amount of light that passes through the zoom lens;
the third lens group is stationary during zooming and includes a lens component having positive refractive power, and the third lens group moves toward the object side from a reference position during focusing from infinity to a near point;
at least one lens component of each of the first and second lens groups includes a lens surface of aspheric shape;
the first and the second lens groups are moved so that the first and second lens groups become closer together and so that the second and third lens groups become farther apart during zooming from the wide-angle end to the telephoto end;
and the following condition is satisfied:

$$f_w/|f_{2\text{-}f}|<0.2$$

where $f_w$ is the focal length of the zoom lens at the wide-angle end, and
$f_{2\text{-}f}$ is the focal length of the image-side lens component of the second lens group.

2. The zoom lens of claim 1, wherein said biconvex lens component includes a biconvex lens element, said biconcave lens component includes a biconcave lens element, and the following condition is satisfied:

$$v_3-v_4>14$$

where $v_3$ is the Abbe number of said biconvex lens element, and
$v_4$ is the Abbe number of said biconcave lens element.

3. The zoom lens of claim 1, wherein the second lens group consists of three lens elements.

4. The zoom lens of claim 1, wherein the third lens group consists of a single lens element.

5. The zoom lens of claim 3, wherein the third lens group consists of a single lens element.

6. The zoom lens of claim 1, wherein the zoom lens consists of five lens components.

7. The zoom lens of claim 1, wherein the zoom lens consists of six lens elements.

8. The zoom lens of claim 1, wherein said reference position of said third lens group is the position of said third lens group when the zoom lens is retracted.

9. The zoom lens of claim 2, wherein said reference position of said third lens group is the position of said third lens group when the zoom lens is retracted.

10. The zoom lens of claim 1, wherein said meniscus lens component has negative refractive power.

11. The zoom lens of claim 2, wherein said meniscus lens component has negative refractive power.

12. The zoom lens of claim 8, wherein said meniscus lens component has negative refractive power.

13. The zoom lens of claim 1, wherein said biconcave lens component and said meniscus lens component include planar peripheral portions parallel to one another and perpendicular to the optical axis of the zoom lens that are in contact with each other or are separated by a plane parallel plate.

14. The zoom lens of claim 2, wherein said biconcave lens component and said meniscus lens component include planar peripheral portions parallel to one another and perpendicular to the optical axis of the zoom lens that are in contact with each other or are separated by a plane parallel plate.

15. The zoom lens of claim 1, wherein said meniscus lens component includes a lens surface of aspheric shape.

16. The zoom lens of claim 2, wherein said meniscus lens component includes a lens surface of aspheric shape.

17. The zoom lens of claim 8, wherein said meniscus lens component includes a lens surface of aspheric shape.

18. The zoom lens of claim 1, wherein said meniscus lens component is made of plastic.

19. The zoom lens of claim 2, wherein said meniscus lens component is made of plastic.

20. The zoom lens of claim 8, wherein said meniscus lens component is made of plastic.

* * * * *

UNITED STATES PATENT AND TRADEMARK OFFICE
CERTIFICATE OF CORRECTION

PATENT NO. : 6,785,057 B2
DATED : August 31, 2004
INVENTOR(S) : Ori

It is certified that error appears in the above-identified patent and that said Letters Patent is hereby corrected as shown below:

Column 1,
Line 19, change "weight" to -- weigh --;

Column 3,
Line 20, change to:
-- $Z = [(Y^2/R) / \{1 + (1 - K \cdot Y^2/R^2)^{½}\}] + A_4 Y^4 + A_6 Y^6 + A_8 Y^8 + A_{10} \cdot Y^{10} \ldots$
(Equation A) --;

Column 5,
Line 21, change "ever shorter" to -- even shorter --; and

Column 9,
Line 49, change to: -- $f_w / |f_{2-f}| < 0.2$ --.

Signed and Sealed this

Second Day of August, 2005

JON W. DUDAS
*Director of the United States Patent and Trademark Office*